(No Model.)

W. F. H. HARVEY.
WHEEL.

No. 571,439. Patented Nov. 17, 1896.

Witnesses:
F. L. Ourand
Jos. L. Coombs

Inventor:
Wm. F. H. Harvey,
by Louis Bagger & Co.
Attorneys.

THE NORRIS PETERS CO., PHOTO-LITHO., WASHINGTON, D. C.

UNITED STATES PATENT OFFICE.

WILLIAM F. H. HARVEY, OF KOKOMO, INDIANA, ASSIGNOR TO JOHN W. LAPPIN, JOHN BRAUN, AND JAMES GAFFNEY, OF SAME PLACE.

WHEEL.

SPECIFICATION forming part of Letters Patent No. 571,439, dated November 17, 1896.

Application filed February 15, 1896. Serial No. 579,339. (No model.)

*To all whom it may concern:*

Be it known that I, WILLIAM F. H. HARVEY, a resident of Kokomo, in the county of Howard and State of Indiana, have invented certain new and useful Improvements in Wheels; and I do hereby declare that the following is a full, clear, and exact description of the invention, which will enable others skilled in the art to which it appertains to make and use the same, reference being had to the accompanying drawings, which form a part of this specification.

My invention relates to bicycle and other wheels, and its object is to provide an improved construction in which a hollow inflated annular air-cushion shall be interposed between the hub of the wheel and the shaft, so that the resiliency of the cushion will take up all jars or shocks in running over uneven or rough ground, and whereby the wheel will possess the characteristics and advantages of a wheel with a pneumatic tire.

The invention consists in the novel construction and combination of parts hereinafter fully described and claimed.

Figure 1:
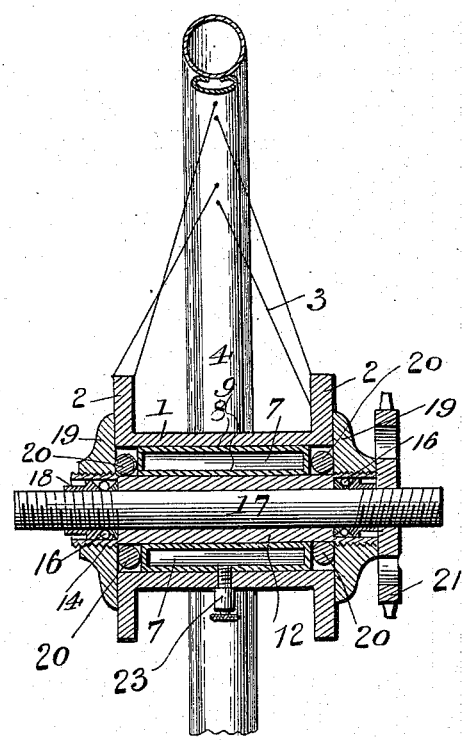
Figure 2:
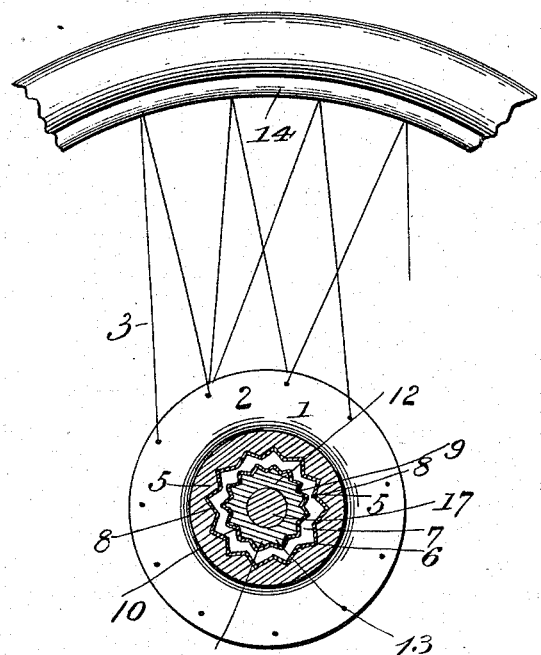
Figure 3:
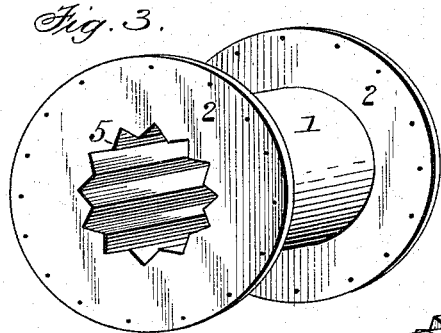
Figures 4, 5, 6:
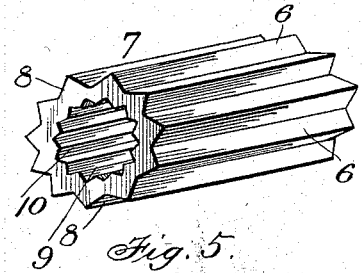
Figure 8:
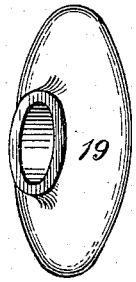
Figure 7:
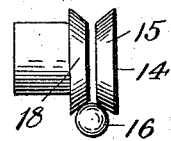

In the accompanying drawings, Figure 1 is a longitudinal sectional view of a wheel constructed in accordance with my invention. Fig. 2 is a cross-section of the same. Figs. 3, 4, 5, 6, 7, and 8 are detail views showing the hub, air-tube, sleeve, axle, ball-bearings, and screw-cap disengaged from each other.

In the said drawings the reference-numeral 1 designates the hub of the wheel, provided at each end with annular flanges 2, to which the inner ends of the spokes 3 are secured, and 4 the rim with which the outer ends of the spokes are connected. The inner surface of the hub is formed with a number of triangular or V-shaped grooves 5, extending from end to end thereof, with which engage correspondingly-shaped ribs 6 on the outer surface of a cylindrical air-cushion 7, consisting of inner and outer concentric rubber shells 8 and 9, closed at each end and inflated with air when in use. The inner shell is formed with ribs 10, similar to the ribs 6. Located within this cylinder is a metal sleeve 12, having a series of triangular or V-shaped grooves 13, which engage with the ribs of the inner section of the cylinder. From this construction it will be seen that the air-cushion will be securely held between the hub and sleeve, so that it cannot rotate independently thereof. The said sleeve is exteriorly screw-threaded at each end to receive the cap hereinafter described, and is recessed interiorly to receive a ring 14, formed with an annular groove 15 at its front edge to receive balls 16, which contact with the sleeve 12 and form the bearings therefor; also mounted in said recess is a ring 18, also grooved on its inner face and formed with interior screw-threads which engage with corresponding threads on the axle or shaft.

The numeral 19 designates a screw-cap which screws onto the end of the sleeve up against the end of the air tube or cushion, a rubber washer 20 being interposed between the same, whereby puncturing of the tube will be prevented.

The numeral 21 designates a sprocket secured to one end of the sleeve.

The numeral 23 designates an inflation-valve passing through the hub and communicating with the air tube or cushion. This valve may be of any ordinary or suitable construction.

A wheel constructed as above will be very efficient in use, as the resiliency of the air tube or cushion will take up any jars or shocks in passing over rough ground, and thus render the wheel very easy running.

Having thus fully described my invention, what I claim is—

In a wheel, the combination with the axle, the sleeve secured thereto having cylindrical recesses in the ends and exterior screw-threads, and formed with triangular ribs, the beveled rings located in said recesses and the balls, of the air-cushion having triangular ribs and grooves on its inner and outer sides the hub formed with corresponding ribs and grooves, and of greater length than the air-cushion, the screw-threaded caps engaging with said sleeve and the washers located in the spaces between said caps and the ends of the air-cushion, substantially as described.

In testimony that I claim the foregoing as my own I have hereunto affixed my signature in presence of two witnesses.

WILLIAM F. H. HARVEY.

Witnesses:
  W. W. DRINKWATER,
  JOS. C. HERRON.